United States Patent [19]

Phipps et al.

[11] Patent Number: 4,926,532

[45] Date of Patent: May 22, 1990

[54] METHOD OF MANUFACTURING A FLOW METER

[76] Inventors: Jackie M. Phipps, 1337 Rutherford Dr., Mesquite, Tex. 75149; Ronald B. Barrier, 15505 Lea Valley Circle, Dallas, Tex. 75248

[21] Appl. No.: 346,794

[22] Filed: May 3, 1989

Related U.S. Application Data

[62] Division of Ser. No. 56,886, Jun. 3, 1987, Pat. No. 4,854,177.

[51] Int. Cl.⁵ ............................................. H01L 41/22
[52] U.S. Cl. .................................... 29/25.35; 73/727; 73/861.24
[58] Field of Search ................. 73/861.24, 861.27, 727, 73/DIG. 4; 29/25.35

[56] References Cited

U.S. PATENT DOCUMENTS

| | | | |
|---|---|---|---|
| 3,402,609 | 9/1968 | Chiku et al. | 73/727 |
| 4,248,098 | 2/1981 | Sawayama et al. | 73/861.24 |
| 4,464,939 | 8/1984 | Corpron | 73/861.24 |
| 4,703,659 | 11/1987 | Lew et al. | 73/861.24 |

Primary Examiner—Carl E. Hall
Attorney, Agent, or Firm—Shlesinger & Myers

[57] ABSTRACT

A piezoelectric vortex flow meter for determining the rate of fluid flow through piping including a hermetically sealed bluff body having a vortex generating plate operably associated with a sensing plate. The vortex generating plate is positioned perpendicular to the fluid flow for creating a "vortex street". A pair of piezoelectric sensors are disposed in a pair of recesses formed in the interior of the sensing plate. Sensing surfaces are formed on each side of the sensing plate adjacent the piezoelectric sensors. The sensing surfaces are formed such that the side surfaces of the sensing plate are free from any discontinuities. The vortices created by the vortex generating plate exert a force on the sensing surfaces which transmit a signal porportional to the force exerted, to the piezoelectric sensors. The piezoelectric sensors transform the mechanical energy into electrical energy readily readable with an appropriate electrical circuit.

7 Claims, 5 Drawing Sheets

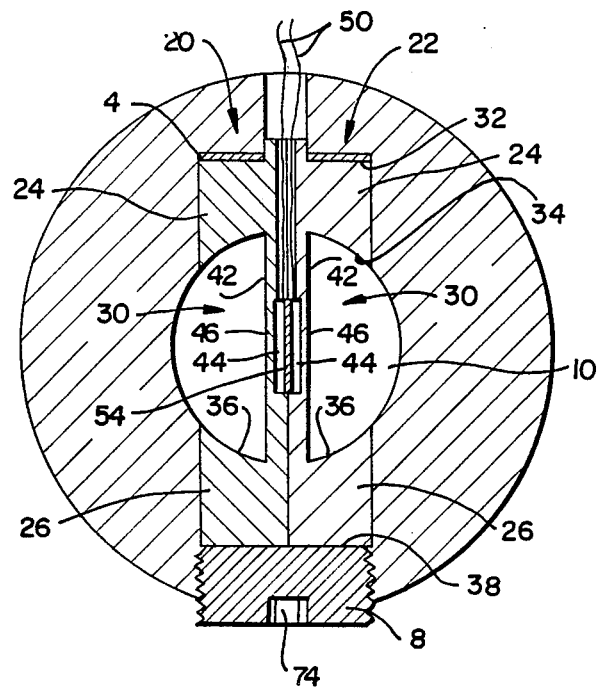
FIG 2
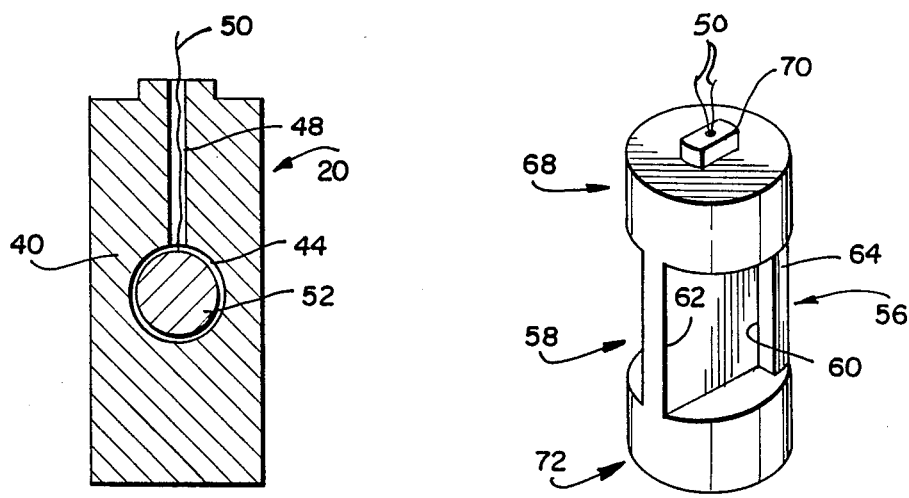
FIG 4
FIG 3

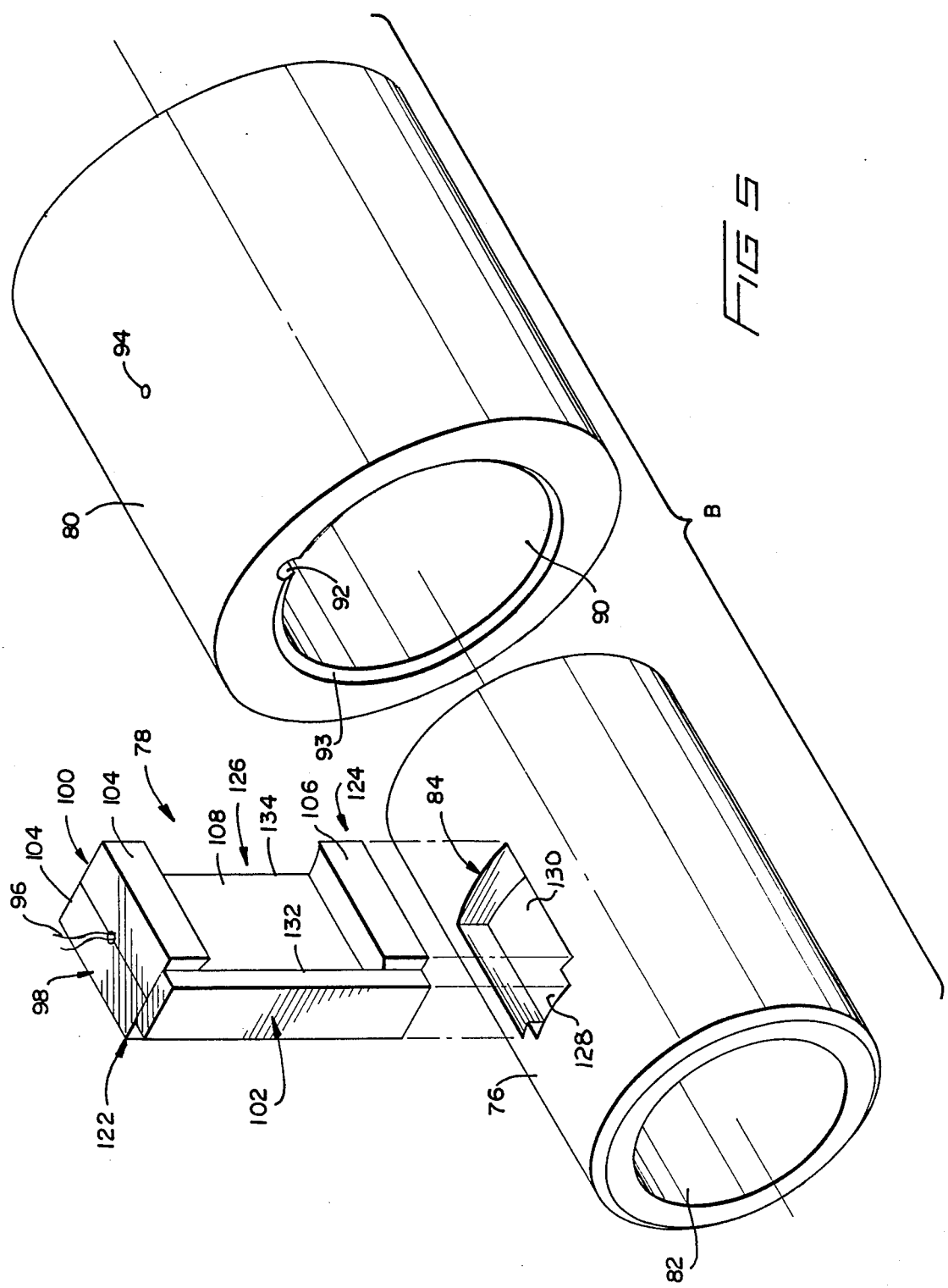

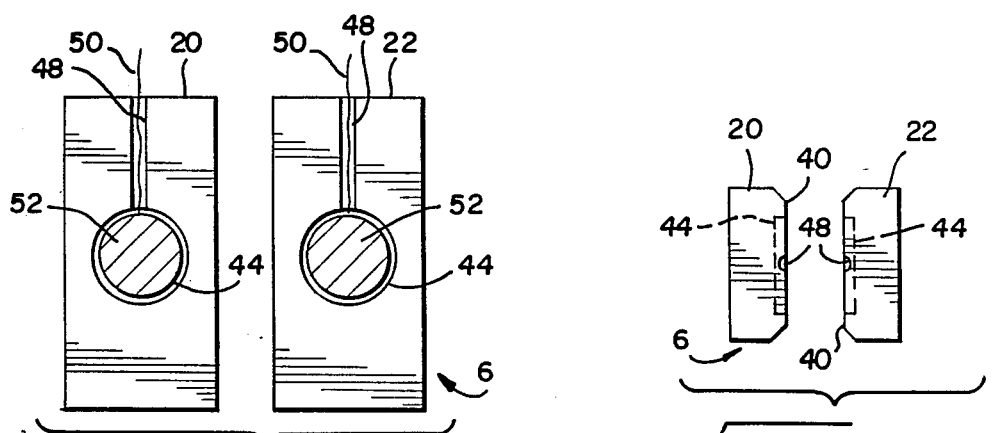
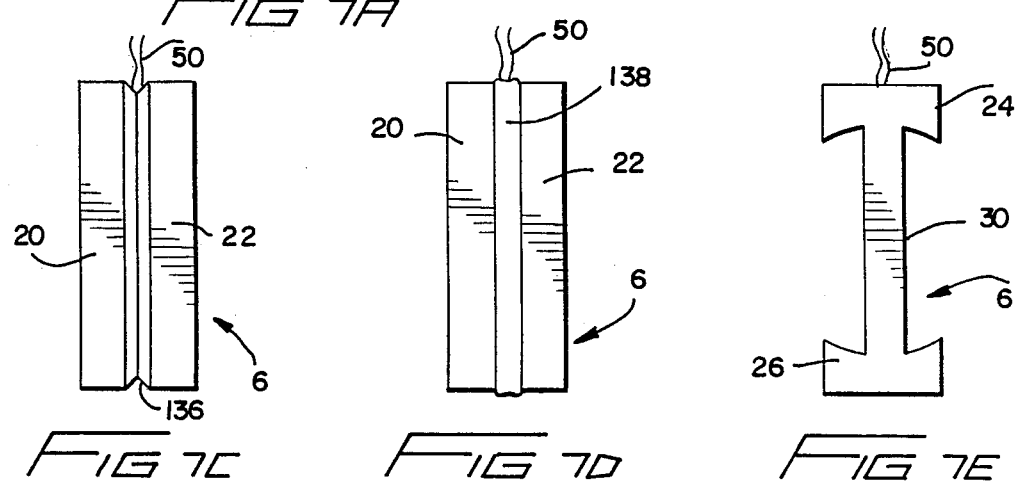
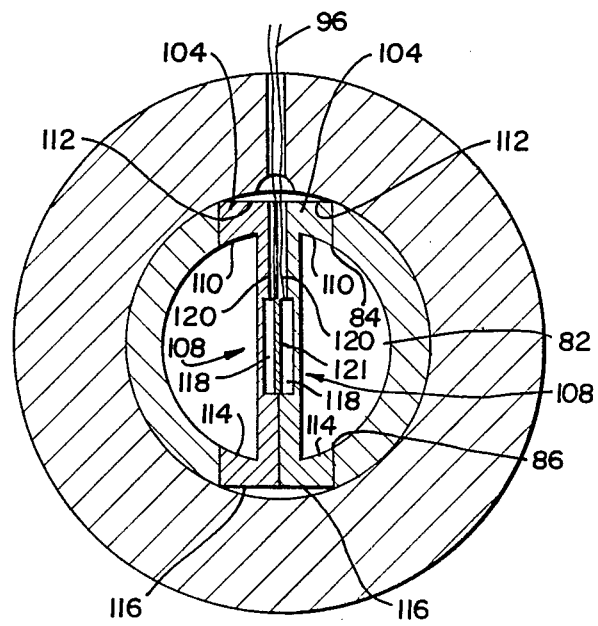
FIG 6

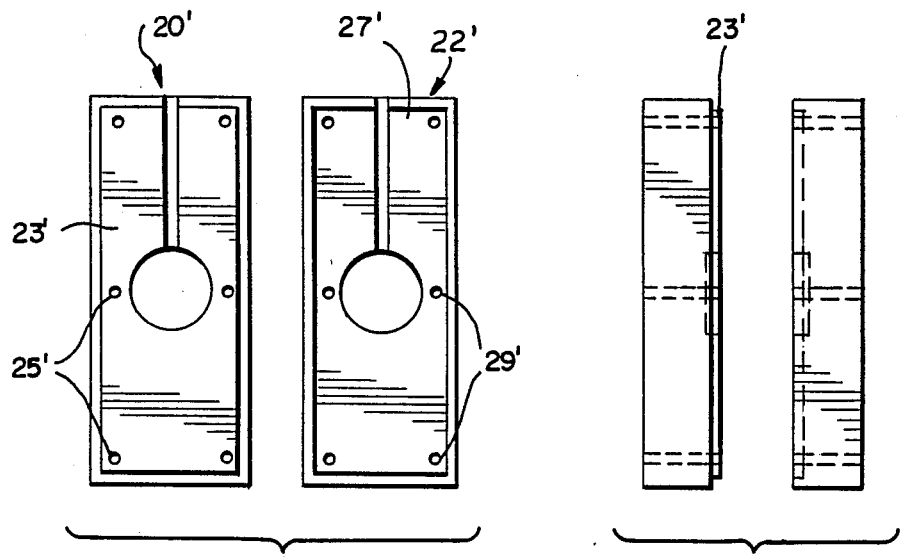

METHOD OF MANUFACTURING A FLOW METER

This is a division of application Ser. No. 07/056,886, filed June 3, 1987, now issued as U.S. Pat. No. 4,854,177 granted Aug. 8, 1989.

FIELD OF THE INVENTION

This invention pertains generally to devices for measuring the flow rate of various fluids through piping.

BACKGROUND OF THE INVENTION

This invention relates to the utilization of the Von Karman vortex principle for determining the flow rate of fluid through piping. Briefly, the Von Karman principle involves the phenomenon that, upon insertion of a bluff body in the stream of fluid flow, a vortices profile is created. The vortices shed alternately at periodic intervals from opposite sides of the bluff body. This particular vortex profile is known as the Von Karman "vortex street". The frequency of the vortices shed by the bluff body is proportional to the velocity of the fluid, either liquid or gas, flowing through the piping. By varying the dimensions of the bluff body, the frequency of the vortex shedding will likewise vary. Each bluff body has a constant known as the K factor. Thus, one can readily determine the flow of fluid through piping by monitoring the frequency of the vortex shedding and having a known K factor for the bluff body.

Numerous devices have been designed for implementing the Von Karman vortex principle in measuring the flow of a fluid through piping. One type of vortex flow meter currently known is the thermal sensor or "hot wire". In this particular vortex flow meter, the voltage and frequency of the sensor element varies with respect to changes in cooling rate, resulting in the intermittent passage of the vortices across the bluff body. The thermal sensor vortex flow meter has several inherent disadvantages, the first being a poor signal to noise ratio. Additionally, the thermal sensors are extremely susceptible to damage by vibrations. Also, the sensors are easily coated when implemented for measuring the flow rate of a gas, thereby adversely affecting the meter's accuracy. Further, the accuracy of the sensor signal significantly decreases when foreign articles from a measured liquid build up on the sensor.

An alternative vortex flow meter implements a disc or shuttle-type sensing element associated with a magnetic pick-up. Pressure pluses created by the vortices in the "vortex street" vibrate the shuttle or disc which is monitored by the magnetic pick-up sensor. However, due to the significant amount of energy required to oscillate the disc or shuttle, the meter cannot be used to satisfactorily determine the flow rate of a gas or similar fluids whose vortices do not exert significant pressure on the sensing body.

A number of vortex flow meters implement piezoelectric crystals or ceramic materials as sensing units. A commonly known piezoelectric flow meter uses a vortex-generating plate integrally attached to a sensing plate. The sensing plate includes a liquid-fluid cavity bounded by a pair of flexible diaphragms welded to the side walls of the sensing plate. This design has a number of inherent disadvantages, namely, a marginal low end measurement capability. This inadequacy of the flow meter is largely a result of a substantial portion of the vortex signal dampened by the oil contained within the cavity. Additionally, the process of welding the diaphragms to the side plates creates discontinuities between the two elements which will ultimately affect the accuracy of the meter. Also, the welds have been readily susceptible to fatigue when the flow meter is used in harsh environments.

To overcome some of the disadvantages of the aforementioned piezoelectric flow meters, it has been known to position the piezoelectric sensors in abutting contact with the diaphragms. In this type of meter, a hole is bored entirely through the sensing plate of the bluff body. Each piezoelectric sensor is placed on a diaphragm and epoxied into the sensing plate. In epoxying the diaphragms to the piezoelectric sensor and subsequently to the sensing plate, air voids are created between the piezoelectric sensors and the diaphragms. This will ultimately dampen the actual vortex signal and thus significantly reduce the accuracy of the flow meter. Further, with time and in harsh environments, the epoxy deteriorates, resulting in the diaphragm loosening or falling off, causing the destruction of the piezoelectric sensors. Finally, the discontinuities between the diaphragms and the sensing plate dampen the vortex signals transmitted to the piezoelectric sensor.

A further type of piezoelectric flow meter currently in use senses the stress of an element created by the "vortex street". This requires a tremendous amount of energy to be exerted on the element before the frequency of the vortices can be detected by the piezoelectric sensors. This type of flow meter can only be used with a minimum Reynolds number of 20,000.

As is readily seen from the aforementioned discussion, prior to the present invention the industry has been lacking in a vortex flow meter capable of detecting low magnitude forces imparted on a bluff body and determining the flow rate of fluid in harsh environments for any substantial period of time.

OBJECTS AND SUMMARY OF THE INVENTION

An object of the present invention is to provide an improved vortex flow meter.

Another object of the invention is to provide a vortex flow meter capable of measuring the flow rate of a wide variety of fluids ranging from gases to corrosive liquids, and liquids with abrasive solids such as liquid sulphur.

Yet another object of the invention is to provide a vortex flow meter having a vortex-generating plate integral with the sensing plate for minimizing dampening of the vortex signal.

A further object of the invention is to provide a vortex flow meter with a housing that will enable an operator to readily insert and extract the bluff body therefrom.

Another object of the invention is to provide a vortex flow meter capable of measuring the flow rate of harsh fluids such as moltened sulphur for lengthy periods of time.

Yet another object of the invention is to provide a vortex flow meter with a bluff body having a centering-/aligning tab for centering the bluff body in a housing without the use of fasteners.

Another object of the invention is to provide a vortex flow meter with substantially planar sensing surface free from any discontinuities thereby significantly reducing the damping effect on the vortex signal.

A further object of the invention is to provide a vortex flow meter that is durable, inexpensive to manufacture and extremely accurate.

Another object of the invention is to provide a vortex flow meter that is able to be inserted in a pipeline while fluid is flowing therethrough.

An additional object of the invention is to provide a vortex flow meter free from air gaps between the sensor and the sensing surface.

Another object of the invention is to provide a meter with the ability to measure vortices produced at a Reynolds number of 10,000 or greater.

Yet another object of the invention is to provide a vortex flow meter with a high vortex signal to noise signal ratio.

Another object of the invention is to provide a vortex flow meter able to withstand pressures of up to 20,000 psi.

An additional object of the invention is to provide a vortex flow meter with a sensor capable of operating over a frequency range 1.0 Hz. to 3 kHz.

Yet another object of the invention is to provide a vortex flow meter with a hermetically sealed bluff body, without glued-on or welded-on diaphragms.

In summary the present invention provides a vortex flow meter having a hermetically sealed bluff body including a vortex-generating plate integral with a sensing plate. The sensing plate includes two side surfaces which are substantially planar and free from any discontinuities. The bluff body further includes a centering-/aligning tab for centering the bluff body in the vortex flow meter housing. The vortex flow meter formed in accordance with the present invention is susceptible to a significantly wider range of uses, and is substantially more durable and accurate than the previously known vortex flow meters.

DETAILED DESCRIPTION OF THE DRAWINGS

FIG. 1 is an exploded view of the vortex flow meter formed in accordance with the present invention.

FIG. 1A is an alternative embodiment of the bluff body of the vortex flow meter depicted in FIG. 1.

FIG. 2 is a cross-section of FIG. 1 with all of the elements of the vortex flow meter assembled in the housing.

FIG. 3 is a perspective view of the bluff body;

FIG. 4 is a cross-sectional view of the bluff body.

FIG. 5 is an exploded view of the second embodiment of the vortex flow meter formed in accordance with the present invention.

FIG. 6 is a cross-sectional view of the second embodiment of the present invention with all of the vortex flow meter elements assembled in the housing.

FIGS. 7A-E depict the process for manufacture of the bluff body.

FIGS. 8A-B depict an alternative process for manufacturing the bluff body.

DESCRIPTION OF THE DRAWINGS

FIGS. 1-4

Referring to FIG. 1, the piezoelectric vortex flow meter A includes a housing 2, a seal 4, a bluff body 6, and a threaded plug 8. Vortex flow meter housing 2 includes an axially extending bore 10 for permitting fluid to flow therethrough. Housing 2 further includes transversely extending recesses 12 and 14. Recess 12 includes first and second portions 16 and 18. First portion 16 extends through the outer periphery of housing 2. Second portion 18 communicates with first portion 16 as well as axial bore 10. Seal 4 rests in second portion 18, as best seen in FIG. 2. Recess 14 extends through the outer periphery of housing 2 opposite recess 12 and communicates with axial bore 10.

Figures 1, 1A:
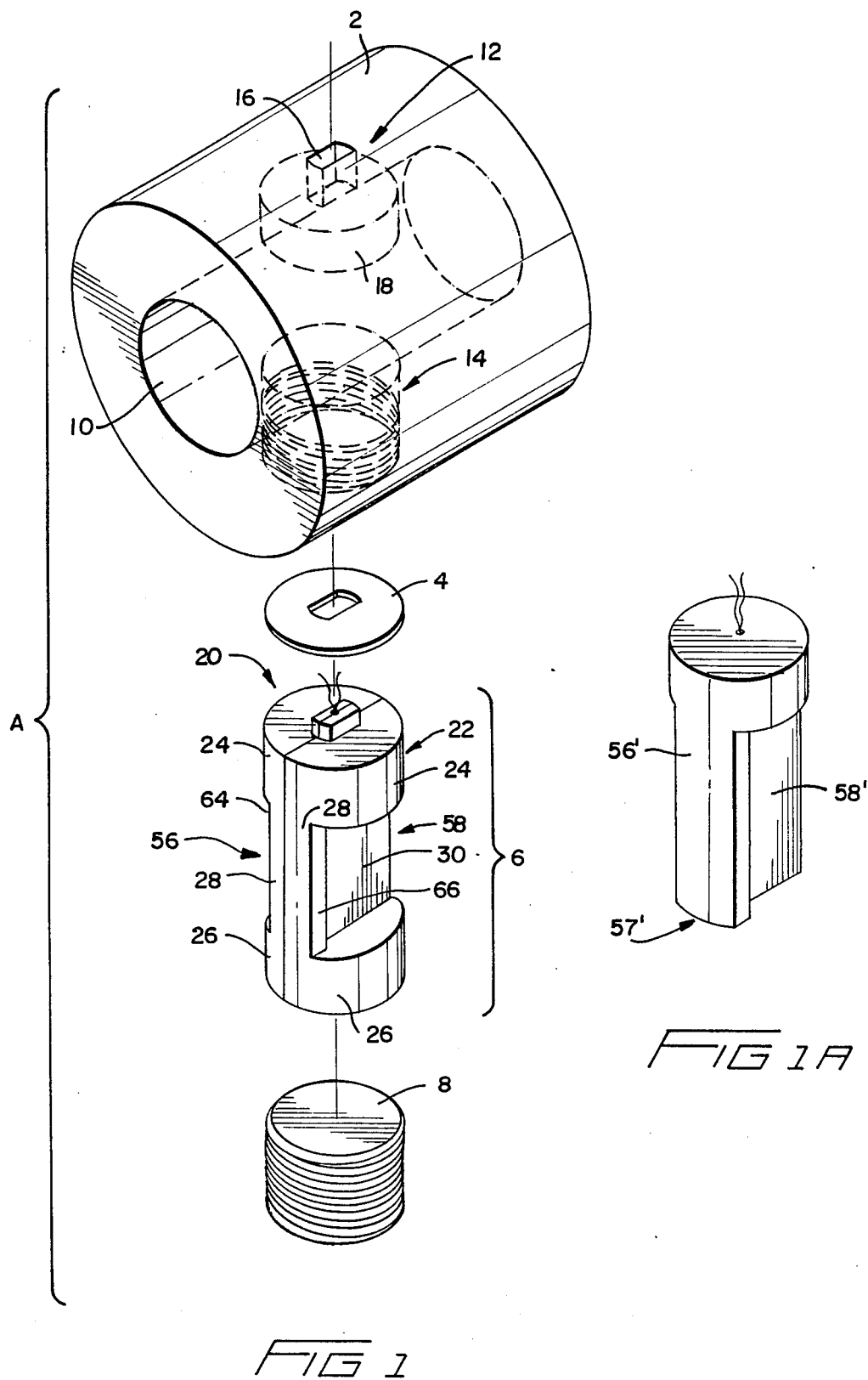

Bluff body 6 includes left and right body members 20 and 22 as viewed in FIGS. 1-4. Left and right body members 20 and 22 are each of one-piece construction and include an upper portion 24, a lower portion 26, a vortex generating portion 28 connecting the upper and lower portions, and a sensing portion 30.

Referring to FIG. 2, the upper portions 24 of left and right body members 20 and 22 each include outer and inner surfaces 32 and 34 respectively. Outer surfaces 32 are substantially planar and abut seal 4. Inner surfaces 34 are arcuate in shape and conform with the radius of axial bore 10. This particular configuration of inner surfaces 34 prevents extraneous elements of bluff body 6 from encountering the fluid flow path thus minimizing turbulence. This feature significantly enhances the accuracy of the vortex flow meter. Lower portions 26 of left and right body members 20 and 22 respectively include outer and inner surfaces 36 and 38. Outer surfaces 38 are substantially planar and positioned in abutting contact with threaded plug 8. Similar to inner surfaces 34, inner surfaces 36 have an arcuate configuration identical to the radius of axial bore 10.

Referring to FIGS. 2-4, sensing portions 30 of left and right body members 20 and 22 include interior and exterior surfaces 40 and 42. Circular recesses 44 extend transversely from interior surfaces 40 and terminate short of exterior surfaces 42, thereby forming sensing surfaces 46 on a portion of the exterior surfaces 42 of sensing portions 30 of left and right body members 20 and 22. A pair of axially extending grooves 48 are formed in left and right body members 20 and 22 for receiving one of a pair of wires 50 (note only one groove 48 is shown).

A piezoelectric sensor 52 is positioned in each of the circular recesses 44 formed in sensing portions 30. Wires 50 are connected at one end to piezoelectric sensors 52 and at the other end to an amplifier not shown. An insulating pad/layer 54 is interposed between the piezoelectric sensor 52 and wire 50 operably associated with left body member 20 and the piezoelectric sensor 52 and wire 50 operably associated with right body member 22. Insulating pad 54 prevents contact between the piezoelectric sensors 52 and wires 50 and thus prevents the sensing system from shorting out. Insulating pad 54 can be formed from an epoxy or like substance.

When left and right body members 20 and 22 are assembled, vortex generating portions 28 together form vortex generating plate generally designated 56. Vortex generating plate 56 is substantially planar and is perpendicular to the flow of fluid through axial bore 10 of housing 2. Further, sensing portions 30 form sensing plate 58 as best seen in FIG. 3. Sensing plate 58 is substantially perpendicular to and integral with vortex generating plate 56. Additionally, sensing plate 58 is positioned in vortex flow meter housing 2 substantially parallel to the fluid flow therethrough.

The sensing plate 58 includes leading and trailing edges 60 and 62 respectively, as best seen in FIG. 3. Sensing plate 58 is tapered slightly inwardly from leading edge 60 to trailing edge 62. Referring to FIG. 1, vortex generating plate 56 includes side edges 64 and 66. Side edges 64 and 66 of vortex generating plate 56 are positioned outwardly from the sensing portions 30 of sensing plate 58. Thus, sensing surfaces 46 are positioned inwardly from the sides 64 and 66 of vortex generating plate 56. This particular configuration ensures that the vortices will shed cleanly at vortex generating plate 56 resulting in the meter accurately determining the flow rate of fluid through housing 2.

Upper portions 24 of left and right body members 20 and 22 form a substantially cylindrical upper alignment element 68 as best seen in FIG. 3. The upper alignment element 68 has a centering/aligning tab 70 extending upwardly therefrom. Upper alignment element 68 is positioned in second portion 18 of recess 12 while centering/aligning tab 70 is positioned in first portion 16 of recess 12. Lower portions 26 of left and right body members 20 and 22 form a substantially cylindrical lower alignment element 72. Lower alignment element 72 is positioned within recess 14. The upper alignment element 68, centering/aligning tab 70 and lower alignment element 72 ensure proper alignment of the bluff body 6 within the housing 2 without the use of fasteners.

Threaded plug 8 is inserted in recess 14 of housing 2. Threaded plug 8 includes a recess 74 for receiving a tool for removing the same from recess 14 of housing 2. Recess 74 can be configured to receive a screwdriver, allen wrench or similar tool, thereby enabling an operator to readily remove bluff body 6 from housing 2.

Referring to FIG. 1A, bluff body 6' is a modified form of bluff body 6 and is designed to be directly inserted into the fluid flow line. Bluff body 6' eliminates the lower alignment element 72 of bluff body 6. Further, the lower end 57' of the bluff body 6' is arcuate in configuration to conform with the axial bore extending through the fluid flow line. It will be readily perceived that the bluff body 6' can be adapted to fit any size line by merely varying the length of the vortex generating plate 56' and the sensing plate 58'.

ALTERNATIVE EMBODIMENT

FIGS. 5 and 6

An alternative form of the present invention will be described with reference to FIGS. 5 and 6. Referring to FIG. 5, the piezoelectric vortex flow meter B includes a housing 76, a bluff body 78, and an outer sleeve 80. Housing 76 includes an axially extending bore 82 for permitting fluid flow therethrough. Housing 76 further includes recesses 84 and 86 positioned directly opposite each other and extending through the outer periphery of housing 76 for communicating with axially extending bore 82.

Outer sleeve 80 includes an axially extending bore 90 for receiving housing 76 therein. Outer sleeve 80 further includes a groove 92 extending axially along bore 90. A hole 94 communicates with groove 92 for permitting wires 96 of bluff body 78 to pass therethrough. Additionally, outer sleeve 80 includes beveled grooves 93 formed along the inner circumference of each end.

Bluff body 78 includes left and right body members 98 and 100, and vortex generating plate 102. Vortex generating plate 102 is secured to left and right body members 98 and 100 by any suitable means such as welding or the like.

Left and right body members 98 and 100 each include an upper portion 104, a lower portion 106, and a sensing portion 108. Upper portions 104 include inner and outer surfaces 110 and 112 as best seen in FIG. 6. Outer surface 110 is substantially planar while inner surface 112 is arcuate in shape. The radius of inner surface 112 is identical to the radius of bore 82 of housing 76. Similarly, lower portions 106 include inner and outer surfaces 114 and 116. Outer surfaces 116 are substantially planar while inner surfaces 114 are arcuate in shape to conform with bore 82. Sensing portions 108 include circular recesses 118 for receiving a pair of piezoelectric sensors (not shown). The piezoelectric sensors, in the preferred form, are substantially contingous with recesses 118. Electrical wires 96 connect the piezoelectric sensors positioned in recesses 118 to an amplifier (not shown). Wires 96 are received in axially extending grooves 120 formed in each of left and right body members 98 and 100. An insulating plate element 121 is positioned intermediate the sensor and wire 96 operably associated with left body member 98 and the sensor and wire 96 operably associated with right body member 100 for preventing a short in the electrical system.

Upper portions 104 form a rectangularly-shaped upper alignment element 122. Lower portions 106 form a rectangularly-shaped lower aligning element 124. Sensing portions 108 form sensing plate 126. Lower alignment element 124 passes through recess 84 and is positioned in recess 86. As is readily seen from FIG. 5, recesses 84 and 86 each include first and second portions 128 and 130. Lower alignment element 124 is positioned within second portion 130 of recess 86 while the lower end of vortex generating plate 102 is received in first portion 128 of recess 86. Similarly, upper alignment element 122 is received in second portion 130 of recess 84 while the upper end vortex generating plate 102 is received in fist portion 128 of recess 84. Upon insertion of the bluff body 78 into housing 76, housing 76 is inserted in axial bore 90 of outer sleeve 80. Outer sleeve 80 is welded to housing 76 along grooves 93. The weld at each end of the vortex flow meter B provides the necessary seal between outer sleeve 80 and housing 76. Unlike vortex flow meter A, the bluff body 78 is not readily removable. The housing 76 and outer sleeve 80 enable vortex flow meter B to be used in high pressure environments.

The vortices generating plate 102 has a width greater than the width of sensing plate 126. Sensing plate 126 includes a leading edge 132 adjacent vortex generating plate 102 and a trailing edge 134. The sensing plate 126 is slightly tapered inwardly in the direction of trailing edge 134. This configuration ensures a clean detachment of the vortices from vortices generating plate 126 and thus enhances the accuracy of the flow meter B.

In environments where the vortex flow meter B is not exposed to high pressures, the housing 80 can be eliminated. The bluff body is then directly inserted and sealed in the housing 76. Further, threads or flanges can be formed on the ends of housing 76 for facilitating insertion of the same in the pipeline.

Bluff body 78 can be adapted in a similar manner as bluff body 6 for direct insertion into the fluid flow line.

METHOD OF MANUFACTURING THE BLUFF BODY

FIGS. 7A-E

The method of manufacturing bluff body 6 will now be described with reference to FIGS. 7A-E. The method of manufacturing bluff body 78 is substantially similar and will not be discussed in detail. However, any differences in the method of manufacturing bluff body 78 will be fully explained.

Left and right body members 20 and 22 are formed substantially identical to each other as seen in FIG. 7A. Transversely extending recesses 44 are formed in each of the body members 20 and 22. Recesses 44 extend from the inner surfaces 40 through only a portion of corresponding body members 20 and 22. Axially extending grooves 48 are formed in left and right body members 20 and 22 and communicate with the corresponding recesses 44. The outer periphery of left and right body members 20 and 22 are beveled as best seen in FIG. 7B. Subsequently, piezoelectric sensors 52 are positioned in recesses 44 and wires 50 associated therewith are received in grooves 48. An epoxy or like adhesive material is applied to the inner face of the piezoelectric sensors 52 and an area of the inner surfaces 40 adjacent recesses 44. This process is referred to as "back filling". The epoxy is further applied along grooves 48 to prevent contact between wires 50.

Subsequently, left and right body members are positioned in abutting contact with each other as best seen in FIG. 7B. The beveled outer peripheries of body member 20 and 22 form a groove 136 extending along the outer periphery of bluff body 6. The left and right body members 20 and 22 are welded along groove 136 as indicated at 138. It is a phenomenon of welding that welded members draw towards the weld. Therefore, body members 20 and 22 will draw inwardly forming a hermetically sealed bluff body. The bluff body is subsequently machined to a desired configuration. As will be readily appreciated from the above discussion, the process of welding the body members at a point intermediate recesses 44 will cause sensing surfaces 46, formed adjacent thereto to draw inwardly towards piezoelectric sensors 52 positioned in recesses 44, thereby eliminating any air pockets therebetween. As previously noted, any air pockets between the piezoelectric sensors and the sensing surface will dampen the actual vortex signal, and ultimately adversely effect the accuracy of the vortex flow meter.

The bluff body 78 includes the additional step of securing the vortex-generating plate 102 to upper and lower alignment elements 122 and 124. Vortex generating portions 28 and the corresponding sensing portions 30 are formed from a single piece and thus alleviate the need for this additional step. This specific arrangement of vortex generating portions 28 and the corresponding sensing portions 30 eliminate any chance of misalignment which may occur in welding a separate vortex generating plate.

An alternative method of manufacturing bluff body 6 will now be described with reference to FIGS. 8A and B. Left body member 20' is provided with a raised substantially rectangular surface 23'. Further, a plurality of holes 25' are formed along the outer circumference of raised surface 23'. Holes 25' extend through left body member 20'.

Right body member 22' is provided with a substantially rectangular surface 27' that is inwardly offset to receive raised surface 23' of left body member 20'. A plurality of holes 29' are formed in the outer circumference of inwardly offset surface 27' and correspond with one of holes 25' formed in left body member 20'. Holes 25' and 27' receive bolts therein for securing the left and right body members 20' and 22' together. Subsequently, the bluff body is machined to the desired configuration.

OPERATION

The operation of the piezoelectric vortex flow meter of the present invention will be described with reference to the first embodiment depicted in FIGS. 1 through 4. The operation of the second embodiment of the piezoelectric vortex flow meter disclosed in FIGS. 5 and 6 will be readily understood from the explanation of the operation of the first embodiment.

The housing 2 is positioned in an appropriate location in the pipeline for which the fluid flow is to be measured. Fluid passes through axial bore 10 and impacts vortex generating plate 56 of bluff body 6. As a result of the fluid striking vortex generating plate 56, the Von Karman "vortex street" is produced. The vortices alternately exert a force on sensing surfaces 46 which in turn transmit a vortex signal to the piezoelectric sensors 52 positioned within recesses 44. The piezoelectric sensors 52 convert the mechanical energy imparted by the vortices on the sensing surface 46 into electrical energy. The piezoelectric sensors 52 are electrically connected by wires 50 to an amplifier which will provide the operator with a signal indicating the flow rate of the fluid therethrough. The process of forming recesses 44 from the interior surfaces 40 outwardly provides sensing plate 58 with a pair of continuous sensing portions 30.

The continuous sensing portions 30 of sensing plate 58 eliminate any dampening of the vortex signal transmitted to the piezoelectric sensors that would result from discontinuities formed thereon. Thus, a high ratio of vortex to noise signal is produced. Further, sensing surfaces 46 being oontinuous with sensing portion 30 provide a significantly more durable sensing plate 58. Therefore, the bluff body 6 can be used to measure the fluid flow of harsh fluids such as molten sulphur without resulting in fatal deterioration thereof.

The vortex flow meters disclosed herein have been described as employing a pair of piezoelectric sensors. However, any suitable sensing element may be used in conjunction with the vortex flow meters of the present invention. Further, a plurality of piezoelectric sensors may be positioned in each body member 20 and 22 to obtain an average flow profile.

In inserting piezoelectric vortex flow meters A and B of the present invention, the fluid flowing through the pipeline must be temporarily cut off in order to insert the respective housings to the pipeline. The bluff bodies 6 and 78 of the present invention can be readily adapted to be inserted in the pipeline while fluid is still flowing therethrough. This process is commonly known as "hot tapping". This process enables the bluff bodies to be readily inserted or extracted from the pipeline without causing any down time in the conduit system.

The present invention provides a vortex flow meter capable of detecting low magnitude forces, producing a high signal to noise ratio and determining the flow rate of fluid in harsh environments for substantial intervals of time.

While this invention has been described as having preferred embodiment, it is understood that it is capable of further modification, uses and/or adaptions of the invention following generally the principle of the invention and including such departures from the present invention and including such departures from the present disclosure as come within the known or customary practice in the art to which the invention pertains and as may be applied to central features set forth and fall within the scope of the invention and of the limits of the appended claims.

What is claimed is:

1. A method of manufacturing a flow meter comprising the steps of:
   (a) providing first and second body members each having inner and outer surfaces;
   (b) forming a first recess extending transversely from the inner surface of said first body member through only a portion thereof thereby forming a first sensing surface;
   (c) associating a first sensing means with said first recess and communicating with said first sensing surface; and
   (d) securing said first body member to said second body member.

2. The method of claim 1 including, the further steps of:
   (a) forming a second recess extending transversely from the inner surface of said second body member through only a portion thereof, thereby forming a second sensing surface.

3. The method of claim 2, including the further steps of:
   (a) associating a second sensing means with said second recess and communicating with said second sensing surface;
   (b) forming said first recess in said first body member substantially opposite said second recess in said second body member; and
   (c) providing insulating means between said first sensing means and said second sensing means.

4. The method of claim 3, including the further step of:
   (a) welding said first body member to said second body member.

5. The method of claim 4, including the further step of:
   (a) drawing said first sensing surface inwardly toward said first sensing means associated with said first recess in said first body member thereby eliminating air gaps between said first sensing means and said first sensing surface.

6. The method of claim 5, including the further step of:
   (a) drawing said second sensing surface inwardly toward said second sensing means associated with said second recess in said second body member thereby eliminating air gaps between said second sensing means and said sensing surface.

7. The method of claim 3, including the further step of:
   (a) forming axially extending grooves in said first and second body members, said grooves communicating with said first and second recesses of said first and second body members, and
   (b) positioning wires associated with said first and second sensing means in said axially extending grooves.

* * * * *